US012664317B2

(12) United States Patent
Klenk et al.

(10) Patent No.: US 12,664,317 B2
(45) Date of Patent: Jun. 23, 2026

(54) EPOCH-BASED MECHANISM FOR PROVIDING DATA INTEGRITY AND RELIABILITY IN A MESSAGING SYSTEM

(71) Applicant: NVIDIA Corporation, Santa Clara, CA (US)

(72) Inventors: Benjamin Klenk, San Jose, CA (US); Al Davis, Coalville, UT (US); Larry Robert Dennison, Mendon, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 409 days.

(21) Appl. No.: 18/074,362

(22) Filed: Dec. 2, 2022

(65) Prior Publication Data

US 2024/0184927 A1      Jun. 6, 2024

(51) Int. Cl.
*G06F 21/64* (2013.01)

(52) U.S. Cl.
CPC ................................... *G06F 21/64* (2013.01)

(58) Field of Classification Search
CPC ....................................................... G06F 21/64
See application file for complete search history.

(56) References Cited

U.S. PATENT DOCUMENTS

2012/0213368 A1* 8/2012 Falk ...................... H04L 9/3271
                                                            380/270
2018/0246645 A1* 8/2018 Havlik .................. G06F 3/0608

| | | | | |
|---|---|---|---|---|
| 2019/0333033 | A1* | 10/2019 | Finlow-Bates | ...... G06Q 20/065 |
| 2020/0127681 | A1* | 4/2020 | Verma | .................... H04L 5/0044 |
| 2020/0153627 | A1* | 5/2020 | Wentz | ...................... H04L 9/50 |
| 2020/0274697 | A1* | 8/2020 | Ragan | ...................... H04L 63/06 |
| 2021/0112020 | A1* | 4/2021 | Radhakrishnan | ... H04L 49/1515 |
| 2021/0152532 | A1* | 5/2021 | Reinhold | .............. H04L 9/0643 |
| 2021/0284196 | A1* | 9/2021 | Sorensen | .............. G16Y 30/10 |
| 2021/0399820 | A1* | 12/2021 | Hoptroff | .............. H04W 12/61 |
| 2022/0311699 | A1* | 9/2022 | Uhrig | .................... H04Q 11/06 |
| 2024/0039701 | A1* | 2/2024 | Lal | .......................... G06F 21/64 |

OTHER PUBLICATIONS

Wikipedia, "Precision Time Protocol," Wikipedia, 2022, 10 pages, retrieved from https://en.wikipedia.org/wiki/Precision_Time_Protocol.

(Continued)

*Primary Examiner* — Blake I Narramore
(74) *Attorney, Agent, or Firm* — Zilka-Kotab, P.C.

(57) ABSTRACT

Messaging protocols used by components in a messaging system to exchange messages conventionally use a reliability mechanism to ensure that each message sent by a sender is received, without compromise, by the intended receiver. Typically, this reliability mechanism involves use of a returned acknowledgement message to the message sender, with automatic retransmission of the message by the sender when the acknowledgement message is not received (e.g. within a defined timeframe). However, existing acknowledgement-based reliability mechanisms require that a sender identifier be included in the message header, which increases the overhead of the message. The present disclosure provides an epoch-based reliability mechanism that allows the sender identifier to be omitted from the message header to minimize overhead and maximize the efficient use of the available bandwidth.

45 Claims, 9 Drawing Sheets

100 identify, for each node in a collective group of nodes configured to at least one of transmit or receive messages as part of a messaging system, a transmit checksum of messages transmitted by the node during an epoch and a receive checksum of messages received by the node that were transmitted during the epoch
102 process the transmit checksums and the receive checksums identified for the collective group of nodes to validate that all messages transmitted by the collective group of nodes during the epoch were correctly received by the collective group of nodes
104

(56) References Cited

OTHER PUBLICATIONS

Nvidia, "Nviidia ConnectX-7 NDR 400G Infiniband Adapter Card," Nvidia Data Sheet, 2021, 3 pages, retrieved from https://www.nvidia.com/content/dam/en-zz/Solutions/networking/infiniband-adapters/infiniband-connectx7-data-sheet.pdf.
Berger, J., "A Note on Error Detection Codes for Asymmetric Channels," Information and control, vol. 4, 1961, pp. 68-73.
Bose et al., "Systematic unidirectional error-detecting codes," IEEE Transactions on Computers, vol. C-34, Nov. 1985, pp. 1026-1032.

* cited by examiner

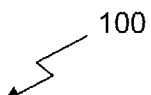
100 identify, for each node in a collective group of nodes configured to at least one of transmit or receive messages as part of a messaging system, a transmit checksum of messages transmitted by the node during an epoch and a receive checksum of messages received by the node that were transmitted during the epoch
102 process the transmit checksums and the receive checksums identified for the collective group of nodes to validate that all messages transmitted by the collective group of nodes during the epoch were correctly received by the collective group of nodes
104

NODE
402

RECEIVE BUFFER
406

SEND/REPLAY
BUFFERS
408

| EPOCH 1 |
| EPOCH 2 |
| EPOCH 3 |

⋮

| EPOCH N |

NIC
404

| HOST INTERFACE 416 | DATA PROCESSOR 417 | NETWORK INTERFACE 418 |

CONTROL PLANE
410

VALIDATOR 412

TIMER 414

MEMORY 420

STAGING BUFFER    TX    RX

| EPOCH 1 | CS | CS |
| EPOCH 2 | CS | CS |
| EPOCH 3 | CS | CS |

⋮

| EPOCH N | CS | CS |

EPOCH-BASED MECHANISM FOR PROVIDING DATA INTEGRITY AND RELIABILITY IN A MESSAGING SYSTEM

TECHNICAL FIELD

The present disclosure relates to mechanisms for providing data integrity and reliability in messaging systems.

BACKGROUND

A messaging protocol refers to the protocol, including the rules, processes, formats, etc., that components in a messaging system use to exchange messages. Traditionally, messaging protocols use some reliability mechanism, such as error detecting/correcting codes in the packet. Negative or positive acknowledgement packets are sent to indicate the receipt of a corrupted vs. correct payload. Corrupted packets must be retransmitted as part of an end-to-end protocol. The reliability mechanism generally is used to detect when a received message is not identical to the message that was originally sent (e.g. as a result of an error introduced by the network) or when a sent message is dropped in a lossy network.

For example, protocols configured for single sender-single receiver messaging can provide point-to-point reliability whereby a message sender transmits a checksum of the message along with the message to a message receiver which then calculates its own checksum upon receipt of the message and compares the two checksums to validate the received message. The message receiver may then return an acknowledgement message to the message sender when the message is valid (i.e. the checksums match) or may cause the message sender to retransmit the message when the message is not valid (i.e. the checksums do not match). In some implementations, the sender may also choose to use an error correction code. This allows the receiver to correct some number of errors and reduces re-transmissions. However, it adds to latency and consumes some bandwidth.

However, as mentioned above, these existing reliability mechanisms rely on the sender being known, and thus require the overhead of a sender identifier being included in the message header. Existing reliability mechanisms therefore cannot support an implementation where it is desired to omit the sender identifier from the message header in order to minimize overhead and maximize the efficient use of the available bandwidth. There is a need for addressing these issues and/or other issues associated with the prior art.

SUMMARY

A method, computer readable medium, and system are disclosed for a low-overhead, epoch-based mechanism to provide integrity and reliability in a messaging system. For each node in a collective group of nodes configured to at least one of transmit or receive messages as part of a messaging system, a transmit checksum of messages transmitted by the node during an epoch and a receive checksum of messages received by the node that were sent during the epoch are identified. The transmit checksums and the receive checksums identified for the collective group of nodes are processed to validate that all messages transmitted by the collective group of nodes during the epoch were correctly received by the collective group of nodes. A method, computer readable medium, and system are disclosed for a low-overhead, epoch-based collective communication mechanism to provide integrity and reliability in a messaging system. In general, a collective is a group of network endpoints/nodes where any node only sends messages to other nodes in the collective. Any message may be unicast to a single node, multicast to a subset of the nodes, or broadcast to all of the other nodes in the collective. When a node in a collective group of nodes sends a message it will be received by one other node in the collective group of nodes, or by a subset of node in the collective group of nodes, or by all other nodes in the collective group of nodes. Time is divided into distinct epochs and each message is tagged with the epoch in which the message is transmitted. Each node in the collective group keeps an epoch specific transmit and receive checksum. After a period of time (time-to-live, TTL) when all messages sent in a particular epoch will have either been received by the intended recipients or dropped by the network due to message corruption or lifetime expiration then all nodes in the collective group of nodes enter a check phase for that epoch. During the check phase, the transmit checksums and the receive checksums identified for the collective group of nodes are collectively reduced and compared to validate that all messages transmitted by the collective group of nodes during the epoch were correctly received by the collective group of nodes. When it is determined that all messages transmitted by the collective group of nodes during the epoch were correctly received by the collective group of nodes (i.e. reduced transmit and receive checksums match), then the messages are committed to the target application. On the other hand, when it is determined that all messages transmitted by the collective group of nodes during the epoch were not correctly received by the collective group of nodes (i.e. reduced transmit and receive checksums do not match), then the messages in the epoch are retransmitted.

BRIEF DESCRIPTION OF THE DRAWINGS

FIG. 1 illustrates a flowchart of an epoch-based method that provides integrity and reliability in a messaging system, in accordance with an embodiment.

DETAILED DESCRIPTION

Figure 2A:
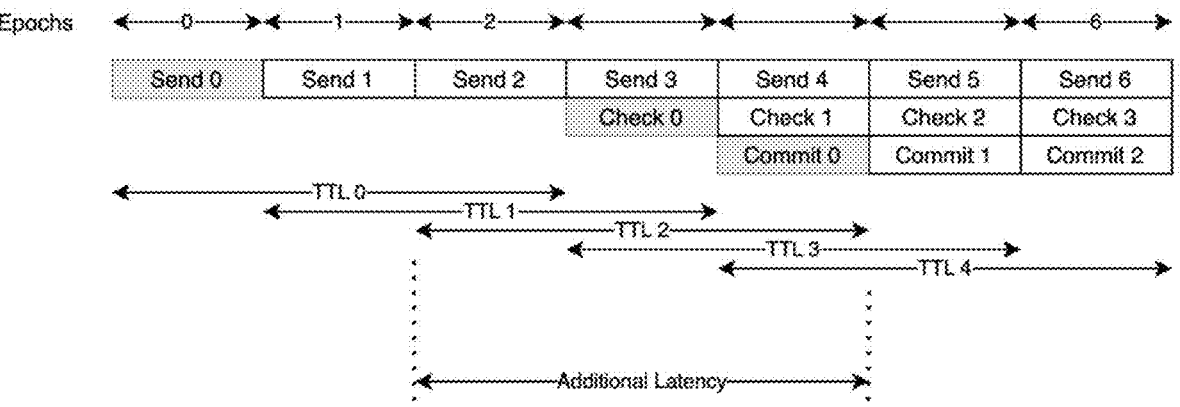
FIGS. 2A-B illustrate timing diagrams of results of the method of FIG. 1, in accordance multiple embodiments.

FIG. 1 illustrates a flowchart of an epoch-based method 100 that provides integrity and reliability in a messaging system, in accordance with an embodiment. Although the method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of messaging. Furthermore, persons of ordinary skill in the art will understand that any system that performs the method 100 is within the scope and spirit of embodiments of the present disclosure.

The messaging system described herein refers to any system comprised of at least a collective group of nodes that are configured to exchange messages (e.g. over one or more networks). The messaging system may also include other hardware and/or software, such as one or more switches, one or more buffers, etc. to enable the exchange of messages among the collective. In an embodiment, the collective may be registered with the messaging system in advance of allowing the exchange of messages among the nodes. This registration may inform each node in the collective of the other nodes participating in the collective.

In an embodiment, the nodes may exchange messages in accordance with a defined messaging protocol. Each message may include a header portion and a payload portion. In the context of the present description, the method 100 is employed, with participation from the nodes, to ensure integrity and reliability of all messages exchanged among the collective. It should be noted that the nodes may be computer systems, devices, etc., or sub-components thereof, that each include hardware and/or software configured to allow the node to send and/or receive messages within the collective.

In an embodiment, the method 100 may be performed by one of the (e.g. selected) nodes in the collective. Optionally, the method 100 may be performed by fixed logic within the node. As another option, the method 100 may be performed by software of the node. In an embodiment, the method 100 may be performed in a network interface of the node.

In another embodiment, the method 100 may be performed by a switch within the messaging system that is further in communication with the collective group of nodes. For example, the method 100 may be performed by fixed logic in the switch(es) or by software in the switch(es).

As mentioned above, the method 100 is epoch-based, which means that the method 100 relies on defined epochs for providing messaging integrity and reliability. With respect to the present description, an epoch refers to a particular division of time, such as a defined time interval or defined period of time. Thus, time may be divided into a plurality of epochs, which may or may not be of the same time length, as discussed in more detail below. In various embodiments, an epoch is defined by (i.e. specified using) a start time and an end time, a start time and a duration of the epoch, only a start time (i.e. when all epochs are of the same time length), or any other data capable of being used to identify the start/end times spanned by an epoch.

Still yet, to support the epoch-based method 100, time is synchronized across the nodes in an embodiment, so that the epochs are likewise synchronized across the nodes. Thus, local clocks of the nodes may be synchronized, for example using a master or global clock.

Also to support the epoch-based method 100, messages transmitted by the nodes in the collective may each be configured to include (e.g. in a message header) an identifier indicating the epoch during which the message was transmitted and an identifier of the collective. As another option, a single (combined) identifier may be used to indicate both the epoch during which the message was transmitted and the collective. In further embodiments, the messages transmitted by the nodes in the collective during any epoch may each exclude (e.g. in the message header) a source identifier of a sender of the message and/or may each exclude a checksum of the payload of the message. In general, the epoch identifier included with each message is used by the nodes to determine, for any given epoch, which messages were transmitted during that epoch. The reasons for this will be set forth in more detail below.

It should be noted that the messages may be communicated through the messaging system in packets. In an embodiment, each packet may include a single message, which may be generated by the sending (source) node or by a switch interfacing the sending node. In another embodiment, each packet may include an aggregated set of messages that were transmitted by the same or different nodes over one epoch or over multiple different epochs. In this case, the packet with the aggregated messages may be generated by the switch interfacing such sending node(s). In either case, for each message included in the packet, the packet includes an indication of the particular epoch during which the message was transmitted by the sending node.

Returning to the description of the method 100, in operation 102, for each node in the collective group of nodes which is configured to transmit and/or receive messages as part of the messaging system, a transmit checksum of messages transmitted by the node during an epoch and a receive checksum of messages received by the node that were transmitted during the epoch are identified. Accordingly, the device performing method 100 identifies an epoch-specific transmit checksum for every node in the collective that has transmitted messages during the epoch, and further identifies an epoch-specific receive checksum for every node in the collective that has received messages that were originally transmitted during the epoch. Accordingly, the nodes in the collective are configured to compute, and communicate to the receiving device, their own transmit/receive checksums on an epoch-by-epoch basis.

In an embodiment where the device performing the method 100 is one of the nodes, the device may compute its own transmit and receive checksums, as appropriate based on its own transmitted and received messages, and may further receive the other nodes' transmit and receive checksums (e.g. directly from those other nodes). In the embodiment where the device performing the method 100 is one or more switches, the device may receive each node's transmit and receive checksums. As mentioned above, the transmit and receive checksums identified from the nodes are specific to an epoch.

With respect to the present description, a transmit checksum for a given epoch refers to a checksum computed by a node on a set of messages transmitted by the node during the epoch (e.g. as identified per the epoch identifier included with the messages). The transmit checksum is computed using a defined checksum function, such as counting a number of 1's in the transmitted messages. In an embodiment, the transmit checksum may be computed as a running checksum that is updated as each message is transmitted (during the epoch) by the node, such as for example as each message is stored in a send buffer or a replay buffer of the node, or even by an inline counting block that updates the checksum as each message enters the send or replay buffers. Also with respect to the present description, a receive checksum for a given epoch refers to a checksum computed on a set of messages received by a node and identified as having been transmitted during the epoch (e.g. per the epoch identifier included with the messages). The receive checksum is also computed using the defined checksum function, in an embodiment. In an embodiment, the receive checksum may be computed as a running checksum that is updated as each message in the epoch is received by the node, such as for example as each message is staged in a staging buffer of the receiving node. Embodiments of these buffers will be provided with reference to the subsequent figures below.

In an embodiment, the transmit and receive checksums may be commutative and cover a larger number of operands (messages). In an embodiment, a Berger code is used, which essentially counts 1s in a bitstream. In an embodiment of the transmit checksum, a 1 may also be added to the checksum for each intended destination of a message (i.e. add the count of destinations for a multicast/broadcast message), for example to account for all-0 messages since a dropped message and an all-0 message would have the same effect on the Berger code without the appended 1. Both send and receive Berger codes are capable of being reduced, which may be useful in some embodiments mentioned further below, using a global sum All-Reduce. In another embodiment, a variation of the Berger code can be used which is the Bose-Lin code, and which throws away high-order bits of the count to reduce the width. This could be used to reduce the width of the count for long epochs and high bandwidth channels.

In operation 104, the transmit checksums and the receive checksums identified for the collective group of nodes are processed to validate that all messages transmitted by the collective group of nodes during the epoch were correctly received by the collective group of nodes. It should be noted that this processing is performed at a point in time after the epoch has ended. In an embodiment, the particular point in time at which the processing is performed may be sufficiently defined in order to allow for a transmission time of the messages from source node to destination node.

In one embodiment, the processing may be performed after a time to live configured for the epoch has expired. In an embodiment, the time to live may be a static (common) value configured for all epochs. In another embodiment, the time to live may be dynamically configured for each epoch, for example based on, or namely as a function of, a health (e.g. congestion) of a network used by the messaging system. Optionally, the time to live may also apply to the timing of the identification of the transmit and receive checksums for the epoch (in operation 102), or in other words, the transmit and receive checksums may be both identified (operation 102) and then processed (operation 104) when the time to live defined for the epoch expires.

Further, with respect to the present description, the processing of the transmit checksums and the receive checksums refers to any predefined functionality (procedure) that is able to use the transmit checksums and the receive checksums identified for the collective group of nodes to validate that all messages transmitted by the collective group of nodes during the epoch were correctly received by the collective group of nodes. In various possible embodiments, the predefined functionality may involve counting all 1's transmitted plus all 1's received to validate a same transmit and receive count (or similarly counting all zero's).

In one exemplary embodiment, the transmit checksums may be reduced and the receive checksums may be reduced, and then the results compared to validate the messages for the epoch. More particularly, the processing may include reducing the transmit checksums to form a reduced transmit checksum for the epoch, reducing the receive checksums to form a reduced receive checksum for the epoch, comparing the reduced transmit checksum and the reduced receive checksum to form a comparison result, and validating that all messages transmitted by the collective group of nodes during the epoch were correctly received by the collective group of nodes, based on the comparison result. With respect to this example, when the comparison result indicates that the reduced transmit checksum and the reduced receive checksum match, then all messages transmitted by the collective group of nodes during the epoch may be validated as having been correctly received by the collective group of nodes. On the other hand, when the comparison result indicates that the reduced transmit checksum and the reduced receive checksum do not match, then all messages transmitted by the collective group of nodes during the epoch may not be validated as having been correctly received by the collective group of nodes, or in other words the received messages may be determined to be invalid for the epoch. It should be noted that other embodiments may involve reducing a composite of the transmit and receive checksums (e.g. receive checksum-transmit checksum). In any case, evaluating the low order bits will allow for the validation that all messages transmitted by the collective group of nodes during the epoch were correctly received by the collective group of nodes, Regardless of the particular validation procedure used, all messages transmitted by the collective group of nodes during the epoch may be caused to be retransmitted by the collective group of nodes, based on a result of the processing. In an embodiment, when the messages are not validated as having been correctly received by the collective group of nodes for the epoch, then all messages transmitted by the collective group of nodes during the epoch may be caused to be retransmitted by the nodes or the messages may simply be discarded.

However, when the messages are validated for the epoch, then those messages may be committed by the nodes in the collective. For example, committing the messages may include making the messages available to their target applications executing on the nodes. In one example, on entering the check phase one node in the collective may be the aggregator so the node knows its own receive checksum and send checksum values and also gets them from all the other nodes in the collective. The aggregator node then adds them up and if they are the same then the epoch is validated and the aggregator node broadcasts a message to the other nodes that the epoch is valid and it is therefore acceptable to commit the messages of that epoch. At this point, the nodes will move that epoch-specific message data from the staging buffer to the commit buffer and will set a flag or interrupt so the application process can start using the data. If the aggregator node finds the epoch was invalid, then it broadcasts a message to the other nodes to retransmit that epoch's messages. At this point, the nodes will each start resending the contents of their replay buffer in the next epoch.

In a second example, every member of the collective may be an aggregator. On entry to the check phase for a particular epoch, all nodes broadcast their receive checksum and transmit checksum values (or the difference therebetween) to all of the other nodes and they all do the summation or equivalence check. At this point, all of the nodes know whether they can enter the commit phase or whether they have to replay whatever they transmitted.

In a third example, there may be multiple (but not all) of the collective nodes that operate as the aggregator, and similarly notify the remaining nodes of a result of the check phase.

To this end, the method 100 is performed on an epoch-by-epoch basis to provide integrity (of received messages) and reliability (of transport) in a messaging system. As mentioned above, the method 100 provides message validation using the transmit and receive checksums calculated per node and per epoch, and accordingly does not rely on transmission of a source identifier and/or checksum with (i.e. in a header of) each message. Omission of this metadata from the message packet in turn improves bandwidth efficiency.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2B:
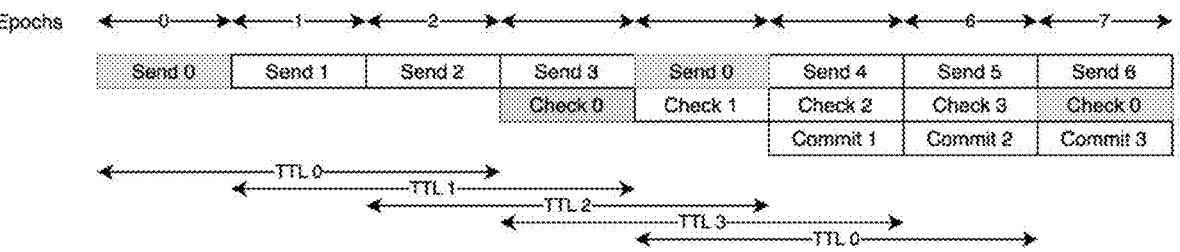

FIGS. 2A-2B illustrate exemplary timing diagrams of different results of the method 100 of FIG. 1. In particular, FIG. 2A illustrates the case where the validation succeeds for an epoch, whereas FIG. 2B illustrates the case where the validation fails and retransmission occurs for an epoch.

In both FIGS. 2A and 2B, messages are transmitted by nodes in the collective during a plurality of sequential epochs (Send 0 . . . Send 6). Given the synchronized clocks across the nodes, the nodes divide time into epochs. The length of an epoch can be defined based on any desired criteria. Short epochs may generally be preferred, as it discards the least number of messages in case of a validation failure (described below). An epoch can also be configured to be much shorter than the mean time between failures (MTBF) of the network, or otherwise messages may be discarded frequently. The epoch may also be a function of (e.g. at least the sum of) the total latency (transfer latency) of the longest path in the network.

For each epoch, a validation procedure (Check 0 . . . Check 3) is performed for the epoch after the epoch's respective time to live (TTL 0 . . . TTL 4) has expired. The validation procedure refers to operations 102-104 of FIG. 1 described above.

In FIG. 2A, the validation procedure succeeds for each of the first 3 epochs (Send 0 through Send 3). As a result, the messages transmitted during those epochs are committed by the receiving nodes (Commit 0 . . . Commit 3).

On the other hand, in FIG. 2B, the validation procedure (first instance of Check 0) for the first epoch (first instance of Send 0) fails. In this case, the collective is caused to retransmit their messages that were originally transmitted during that first epoch (i.e. Send 0 is replayed). The retransmission is illustrated as the second instance of Send 0. When the time to live for the replayed epoch expires (the second instance of TTL 0), then the validation procedure (second instance of Check 0) is performed for the replayed epoch, which, in the example shown, is successful.

Figure 3:
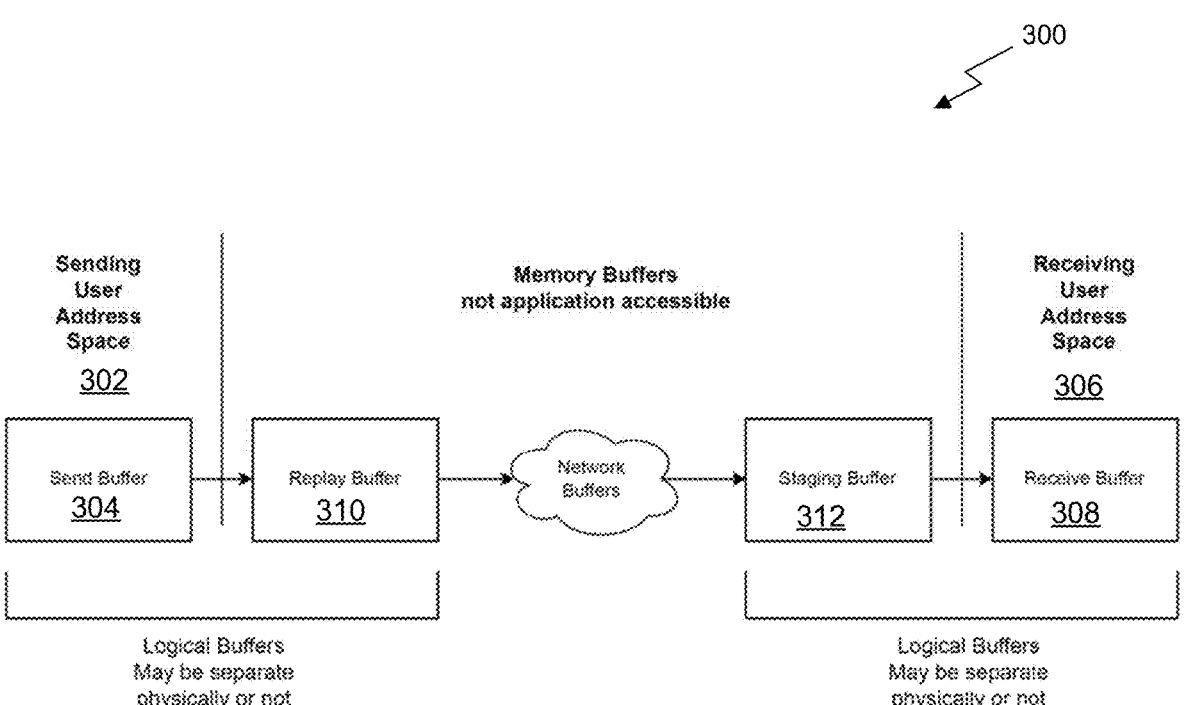
FIG. 3 illustrates a logical buffer system employed for providing messaging integrity and reliability in a messaging system comprised of a collective group of nodes, in accordance with an embodiment.

FIG. 3 illustrates a logical buffer system 300 employed for providing messaging integrity and reliability in a messaging system comprised of a collective group of nodes, in accordance with an embodiment. The logical buffer system 300 is implemented across at least a sending node 302 of the collective and a receiving node 306 of the collective, but may also include one or switches of the messaging system in other embodiments. It should be noted that the sending node 302 in the present embodiments is representative of every node in the collective that transmits messages to at least one other node in the collective. Likewise, the receiving node 306 in the present embodiments is representative of every node in the collective that receives messages from at least one other node in the collective.

The logical buffer system 300 includes a send buffer 304 located in the sending node 302 of the collective. The send buffer 304 may be located in memory of the sending node 302, and may be accessible to one or more applications executing on the sending node 302. The send buffer 304 may be used by the sending node application(s), or otherwise by the sending node, to transmit messages to the collective. In particular, the messages may be transmitted from the send buffer 304.

The logical buffer system 300 also includes a receive buffer 308 located in the receiving node 306 of the collective. The receive buffer 308 may be located in memory of the receiving node 306, and may be accessible to one or more applications executing on the receiving node 306. The receive buffer 308 may be used by the receiving node application(s), or otherwise by the receiving node, to retrieve messages received from the collective for processing thereof.

A replay buffer 310 is also provided in the logical buffer system 300. The replay buffer 310 stores a copy of the messages transmitted from the send buffer 304. In case retransmission of the messages for a given epoch is required (due to a validation failure for the epoch as described in operation 104 of FIG. 1), then the messages originally transmitted during that epoch are retransmitted from the replay buffer 310. Messages may be removed from the replay buffer 310 when the validation is successful. The replay buffer 310 may be logically organized by epoch, so that messages may be retransmitted or removed on an epoch-by-epoch basis.

The replay buffer 310 may be physically separate from the send buffer 304, in an embodiment. In another embodiment, the replay buffer 310 may be physically located in the same sending node memory as the send buffer 304 but may be logically separate from the send buffer 304. In various embodiments, the replay buffer 310 may be generally located in the sending node 302 or in a switch of the messaging network, such as for example in a network interface of the sending node 302 and/or the switch. In any case, the replay buffer 310 may not be accessible to applications executing on the sending node 302. As another option, however, the replay buffer 310 may not be included but instead the transmitted messages may be kept in the send buffer 304 until the validation is successful.

The logical buffer system 300 further includes a staging buffer 312. The staging buffer 312 stages (temporarily stores) messages already transmitted and received, but not yet processed by the validation procedure. The staging buffer 312 stages the messages for any given epoch until the validation for that epoch is complete. When the validation for an epoch fails, the messages associated with the epoch (i.e. having the epoch identifier) are caused to be retransmitted, as described above, and these messages are removed from the staging buffer 312. When the validation for an epoch succeeds, the messages associated with the epoch are moved from the staging buffer 312 to the receive buffer 308, or in other words are committed to the receiving node 306. The staging buffer 312 may be logically organized by epoch, so that messages may be removed or committed on an epoch-by-epoch basis.

The staging buffer 312 may be physically separate from the receive buffer 308, in an embodiment. In another embodiment, the staging buffer 312 may be physically located in the same receiving node memory as the receive buffer 308 but may be logically separate from the receive buffer 308. In various embodiments, the staging buffer 312 may be generally located in the receiving node 306 or in a switch of the messaging network, such as for example in a network interface of the receiving node 306 and/or the switch. Regardless of location, the staging buffer 312 may not be accessible to applications executing on the receiving node 306.

As noted above, the staging buffer 312 may hold different epochs that are being validated at the same time. Assume the time to live is absolute for all epochs and is set to length of time spanned over three epochs. This means it is expected that after three epochs all receiving nodes are expected to have received all messages sent to them during the given epoch the validation of the epoch can begin. The validation may be required to finish within an epoch and may involve in-network computation, such as reductions, and priority traffic classes to keep latency low (e.g. below 3 us). During the subsequent epoch, a valid epoch in the staging buffer 312 can be copied to the respective receive buffer 308. Accordingly, the staging buffer can be reused after TTL+time to check+time to copy to receive buffer (you may not start checking right away so there could be some additional delay). The number of epochs used for time to live may depend on the expected traffic pattern. The size of a staging buffer 312 will be a function of when the staging buffer 312 is available for re-use. If the traffic pattern is not uniformly random and incast traffic at one node is experienced, it may not be possible to receive all the messages belonging to one epoch within the time to live. This means the messages in the epoch will be retransmitted. In an embodiment then, a form of injection rate limiting, or any other congestion control mechanism, may be used to space out the messages into multiple epochs for retransmission.

To this end, there are two buffers that need to be sized appropriately: the replay buffer 310 and the staging buffer 312. The replay buffer 310 must keep the messages until that epoch is found to be valid. The staging buffer 312 must keep the messages until that epoch has been validated+committed (copied).

Figure 4:
FIG. 4 illustrates a system implementing an epoch-based integrity and reliability mechanism for a messaging system, in accordance with an embodiment.

FIG. 4 illustrates a system 400 implementing an epoch-based integrity and reliability mechanism for a messaging system, in accordance with an embodiment. The system 400 may be implemented in the context of the description of the previously described figures. Of course, it should be noted that the system 400 is just one possible implementation.

The system 400 includes a node 402 of a collective group of nodes. In the present embodiment, the node 402 both transmits messages to the collective and receives messages from the collective. Accordingly, the node 402 includes both a receive buffer 406, in which messages that have been received from the collective and validated are stored, as well as send/replay buffers 408 that logically includes both a send buffer for storing messages transmitted by the node 402 and a replay buffer for storing a copy of those transmitted messages for use when message retransmission is required. As shown, the send/replay buffers 408 are logically organized on an epoch-by-epoch basis, in accordance with one exemplary embodiment.

The node 402 interfaces a network interface card (NIC) 404, which may be physically attached to the node 402 or to a switch of the messaging system. The NIC 404 includes a host interface 416 through which the node 402 and the NIC 404 communicate. The NIC 404 also includes a data processor 417 which operates to perform data processing functions of the NIC 404. The NIC 404 includes a network interface 418 through which the NIC 404 communicates with other components of the messaging system, such as one or more switches, other nodes in the collective, etc.

The NIC 404 includes a control plane 410 that performs the validation procedure (described in operation 104 of FIG. 1). The control plane 410 includes a validator 412 to perform the validation procedure. The validator 412 includes hardware and/or logic that validates messages on an epoch-by-epoch basis (see an example of the validator 412 logic in FIG. 6).

As shown, the validator 412 interfaces memory 420 of the NIC 404 which stores, in epoch-specific staging buffers, the messages associated with each epoch as well as the reduced transmit (TX) checksum and the reduced receive (RX) checksum for that epoch. These reduced transmit and receive checksums are calculated by the NIC 404 (see an example of the reduction logic FIG. 7).

The validator 412 performs the validation of messages, per epoch, by comparing the reduced transmit and receive checksums. For an epoch with matching reduced transmit and receive checksums, the messages in that epoch are committed to the receive buffer 406 of every target receiving node in the messaging system. For non-matching checksums, the NIC 404 causes the sending nodes to retransmit their messages originally sent during that epoch, from their local replay buffers.

The NIC 404 also includes a timer 414. The timer 414 includes a local clock that is synchronized with the local clocks of other nodes and other components of the messaging system (see an example of the timer 414 logic in FIG. 5). This ensures the synchronization of epochs across all nodes and any other components of the messaging system.

Figure 5:
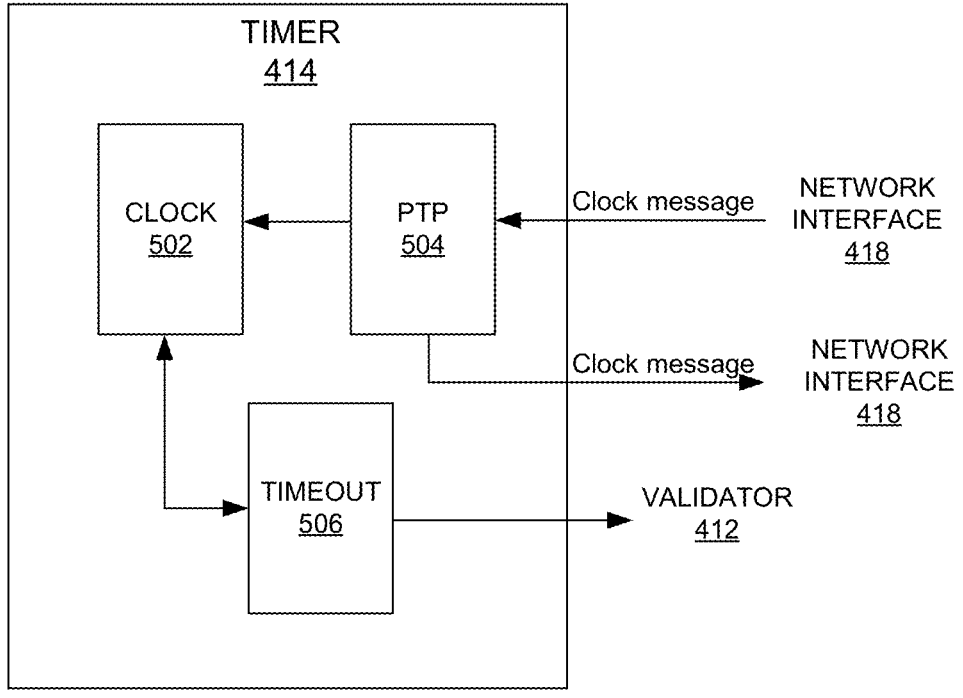
FIG. 5 illustrates the timer in FIG. 4, in accordance with an embodiment.

FIG. 5 illustrates the timer 414 of the NIC 404 in FIG. 4, in accordance with an embodiment. Of course, the present embodiment of the timer 414 is set forth for illustrative purposes only and should not be construed as limiting in any manner.

The timer 414 includes a precision time protocol (PTP) component 504 that receives a clock message through the network interface 418. The clock message is a time distributed from a master clock for use in updating the local clock 502. In an embodiment, the master clock sources the time for the network, for example through the global positioning system (GPS). When the PTP component 504 receives the clock message, it calculates round-trip delays and sends delay requests back to the master (shown as the clock message output back to the network interface 418), to which the master responds. The resulting information is used to calculate an offset to the local clock 502.

Further, the local clock 502 is used to keep track of the expiration of a time to live for each epoch. Upon expiration of the time to live for an epoch, the timer 414 causes a timeout module 506 to communicate with the validator 412 cause initiation of the validation procedure for the epoch.

Figure 6:
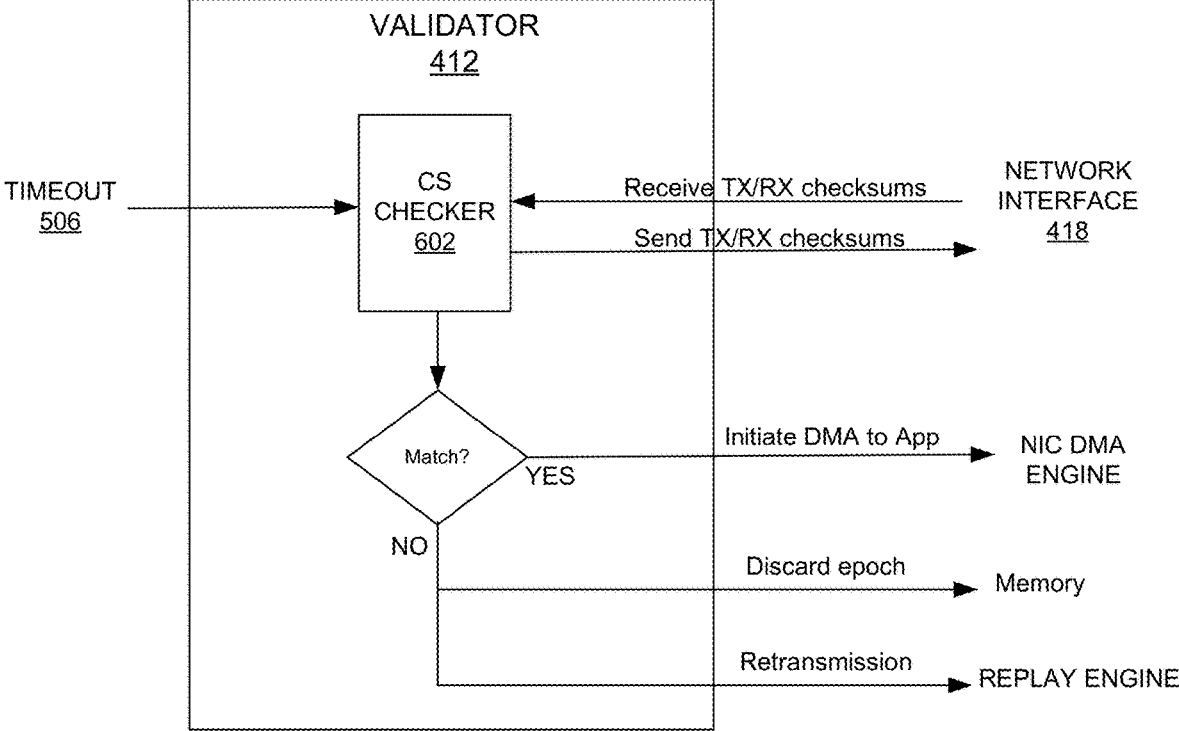
FIG. 6 illustrates the validator in FIG. 4, in accordance with an embodiment.

FIG. 6 illustrates the validator 412 of the NIC 404 in FIG. 4, in accordance with an embodiment. Of course, the present embodiment of the validator 412 is set forth for illustrative purposes only and should not be construed as limiting in any manner.

The validator 412 includes a CS (checksum) checker 602 that receives the transmit and receive checksums from the nodes for a given epoch (per the timeout/expiration of the epoch time to live) and compares the same, or compares some derivation thereof (e.g. reduced transmit and received checksums). If there is a match, messages in that epoch are moved from the staging buffer of the memory 420 of the NIC 404 to the receive buffers of the target nodes.

If there is not a match, messages in that epoch are discarded from the staging buffers of the memory 420 of the NIC 404 and a replay engine is triggered to cause the sending nodes to retransmit the messages that were originally transmitted during that epoch.

Figure 7:
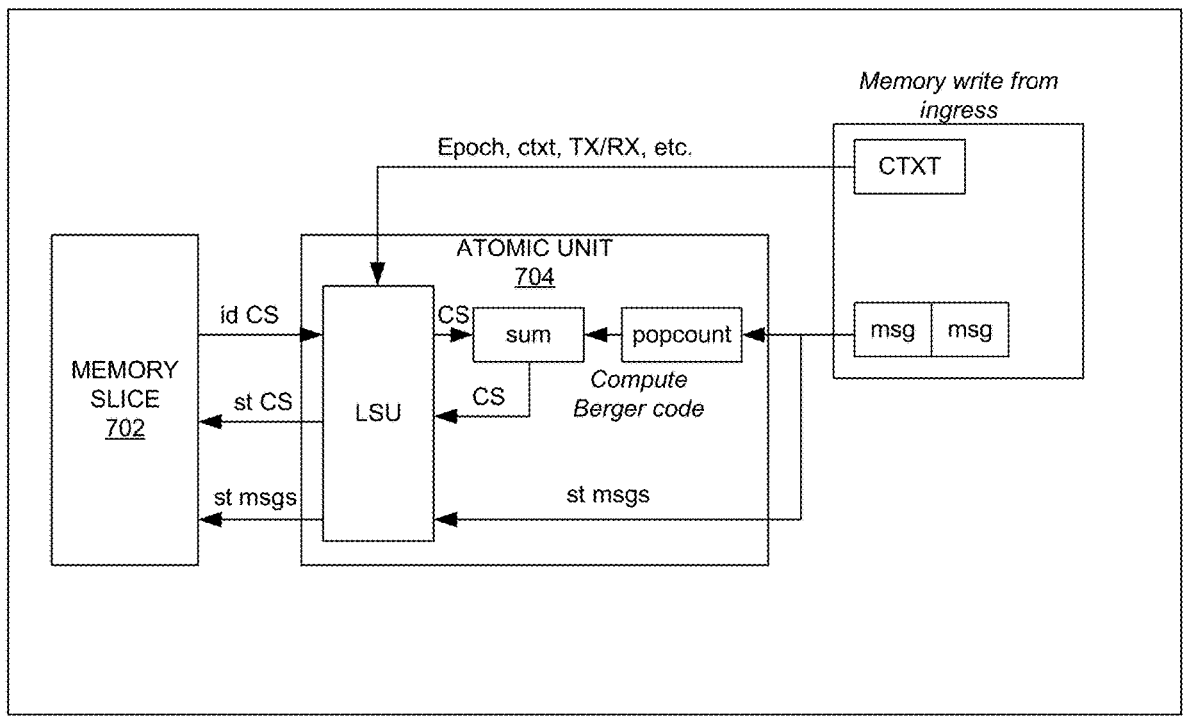
FIG. 7 illustrates logic of FIG. 4 for calculating checksums, in accordance with an embodiment.

FIG. 7 illustrates logic of the NIC 404 in FIG. 4 for calculating checksums, in accordance with an embodiment. Of course, the present embodiment of the logic is set forth for illustrative purposes only and should not be construed as limiting in any manner.

As shown, the reduction of receive and transmit checksums, respectively and per epoch, is performed in the logic of the NIC 404, and the reduced checksums are maintained in the memory slice 702 of the NIC 404.

EMBODIMENTS ASSOCIATED WITH THE IMPACT ON LATENCY

Embodiments described herein will generally add additional latency, which is governed at least in part by the time to live. However, the present embodiments achieve the highest bandwidth for streaming applications where message rate and bandwidth efficiency are more important than individual message latency.

Figure 8:
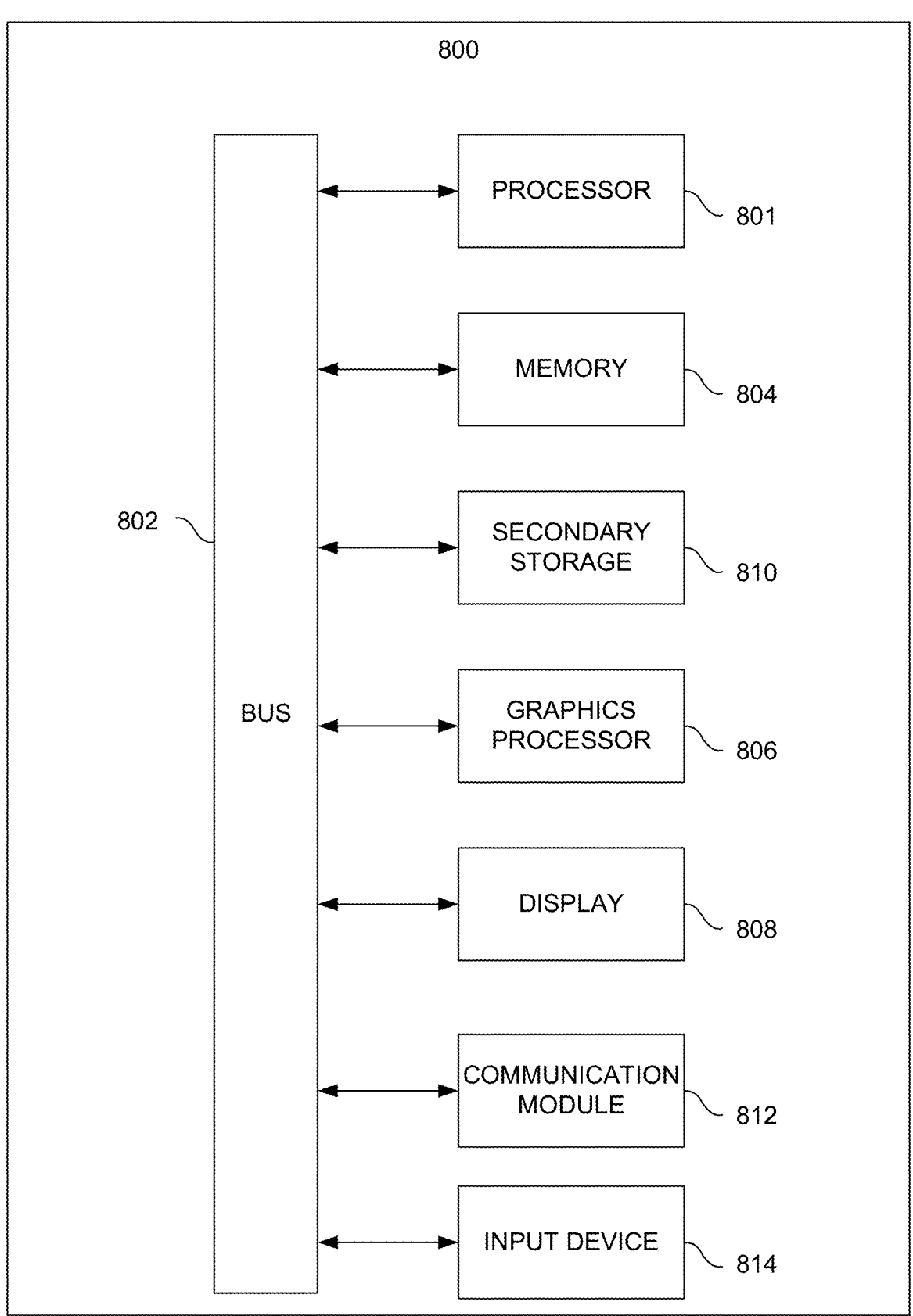
FIG. 8 illustrates an exemplary computing system, in accordance with an embodiment.

FIG. 8 illustrates an exemplary computing system 800, in accordance with an embodiment. One or more of the components shown in system 800 may be implemented within the messaging devices and switches described herein, such that the hardware and software of the messaging devices and switches are configured to enable the messaging devices and switches to function in accordance with the embodiments described.

As shown, the system 800 includes at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, a flash drive or other flash storage, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions, including for example sending, receiving, and/or processing messages in accordance with the epoch-based messaging protocol. Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices (e.g. game consoles, personal computers, servers etc.) through a variety of possible standard or proprietary wired or wireless communication protocols (e.g. via Bluetooth, Near Field Communication (NFC), Cellular communication, etc.).

As also shown, the system 800 may include one or more input devices 814. The input devices 814 may be a wired or wireless input device. In various embodiments, each input device 814 may include a keyboard, touch pad, touch screen, game controller, remote controller, or any other device capable of being used by a user to provide input to the system 800.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
at a device:
identifying a collective group of nodes configured to at least one of transmit or receive messages as part of a messaging system;
collecting a plurality of transmit checksums for the collective group of nodes, wherein each transmit checksum of the plurality of transmit checksums corresponds to a different node in the collective group of nodes and is a checksum of messages transmitted by the different node during a defined epoch;
collecting a plurality of receive checksums for the collective group of nodes, wherein each receive checksum of the plurality of receive checksums corresponds to the different node in the collective group of nodes and is a checksum of messages received by the different node during the defined epoch; and
collectively processing the plurality of transmit checksums and the plurality of receive checksums to validate that all messages transmitted by the collective group of nodes during the defined epoch were correctly received by the collective group of nodes.

2. The method of claim 1, wherein the device is one node in the collective group of nodes.

3. The method of claim 2, wherein the method is performed by fixed logic of the one node.

4. The method of claim 2, wherein the method is performed by software of the one node.

5. The method of claim 1, wherein the device is one or more switches in communication with the collective group of nodes.

6. The method of claim 5, wherein the method is performed by fixed logic in the one or more switches.

7. The method of claim 5, wherein the method is performed by software in the one or more switches.

8. The method of claim 1, wherein the messages transmitted by the different node during the defined epoch each include at least one identifier indicating the defined epoch during which the message was transmitted and the collective group of nodes.

9. The method of claim 1, wherein the messages transmitted by the different node during the defined epoch each exclude a source identifier of a sender of the message.

10. The method of claim 1, wherein the messages transmitted by the different node during the defined epoch each exclude a checksum of a payload of the message.

11. The method of claim 1, wherein local clocks of all nodes in the collective group of nodes are synchronized.

12. The method of claim 11, wherein the local clocks are synchronized using a master clock.

13. The method of claim 1, wherein the processing is performed after a time to live configured for the defined epoch has expired.

14. The method of claim 13, wherein the time to live is a static value configured for all epochs.

15. The method of claim 13, wherein the time to live is dynamically configured for each epoch of a plurality of epochs.

16. The method of claim 15, wherein the time to live is dynamically configured based on a health of a network used by the messaging system.

17. The method of claim 1, wherein collectively processing the plurality of transmit checksums and the plurality of receive checksums includes:

reducing the plurality of transmit checksums to form a reduced transmit checksum for the defined epoch, reducing the plurality of receive checksums to form a reduced receive checksum for the defined epoch, comparing the reduced transmit checksum and the reduced receive checksum to form a comparison result, validating that all messages transmitted by the collective group of nodes during the defined epoch were correctly received by the collective group of nodes, based on the comparison result.

18. The method of claim 17, wherein when the comparison result indicates that the reduced transmit checksum and the reduced receive checksum match, then all messages transmitted by the collective group of nodes during the defined epoch are validated as having been correctly received by the collective group of nodes.

19. The method of claim 17, wherein when the comparison result indicates that the reduced transmit checksum and the reduced receive checksum do not match, then all messages transmitted by the collective group of nodes during the defined epoch are not validated as having been correctly received by the collective group of nodes.

20. The method of claim 1, further comprising:

causing all messages transmitted by the collective group of nodes during the defined epoch to be retransmitted by the collective group of nodes, based on a result of the processing.

21. The method of claim 1, wherein each node in the collective group of nodes includes a send buffer from which messages are transmitted by the each node.

22. The method of claim 1, wherein each node in the collective group of nodes that transmits a message during the defined epoch as part of the messaging system includes a replay buffer to store the message, for use in retransmitting the message when required based on a result of the processing.

23. The method of claim 22, wherein the replay buffer is specific to the defined epoch.

24. The method of claim 1, wherein each node in the collective group of nodes that receives a message during the defined epoch as part of the messaging system includes a staging buffer, for staging the message during the processing of the plurality of transmit checksums and the plurality of receive checksums.

25. The method of claim 1, each node in the collective group of nodes includes a receive buffer in which messages that have been both received by the each node and validated are stored for access by an application of the each node.

26. A system, comprising:

a non-transitory memory storage of a receiving device comprising instructions; and one or more processors of the receiving device in communication with the memory, wherein the one or more processors execute the instructions to:

identify a collective group of nodes configured to at least one of transmit or receive messages as part of a messaging system;

collect a plurality of transmit checksums for the collective group of nodes, wherein each transmit checksum of the plurality of transmit checksums corresponds to a different node in the collective group of nodes and is a checksum of messages transmitted by the different node during a defined epoch;

collect a plurality of receive checksums for the collective group of nodes, wherein each receive checksum of the plurality of receive checksums corresponds to the different node in the collective group of nodes and is a checksum of messages received by the different node during the defined epoch; and collectively process the plurality of transmit checksums and the plurality of receive checksums to validate that all messages transmitted by the collective group of nodes during the defined epoch were correctly received by the collective group of nodes.

27. The system of claim 26, wherein the system is one node in the collective group of nodes.

28. The system of claim 26, wherein the system is one or more switches in communication with the collective group of nodes.

29. The system of claim 26, wherein the messages transmitted by the different node during the defined epoch each include at least one identifier indicating the defined epoch during which the message was transmitted and the collective group of nodes.

30. The system of claim 26, wherein the messages transmitted by the different node during the defined epoch each exclude a source identifier of a sender of the message.

31. The system of claim 26, wherein the messages transmitted by the different node during the defined epoch each exclude a checksum of a payload of the message.

32. The system of claim 26, wherein local clocks of all nodes in the collective group of nodes are synchronized.

33. The system of claim 26, wherein the processing is performed after a time to live configured for the defined epoch has expired.

34. The system of claim 26, wherein collectively processing the plurality of transmit checksums and the plurality of receive checksums includes:

reducing the plurality of transmit checksums to form a reduced transmit checksum for the defined epoch, reducing the plurality of receive checksums to form a reduced receive checksum for the defined epoch, comparing the reduced transmit checksum and the reduced receive checksum to form a comparison result, validating that all messages transmitted by the collective group of nodes during the defined epoch were correctly received by the collective group of nodes, based on the comparison result.

35. The system of claim 34, wherein when the comparison result indicates that the reduced transmit checksum and the reduced receive checksum match, then all messages transmitted by the collective group of nodes during the defined epoch are validated as having been correctly received by the collective group of nodes, and wherein when the comparison result indicates that the reduced transmit checksum and the reduced receive checksum do not match, then all messages transmitted by the collective group of nodes during the defined epoch are not validated as having been correctly received by the collective group of nodes.

36. The system of claim 26, wherein the one or more processors further execute the instructions to:

cause all messages transmitted by the collective group of nodes during the defined epoch to be retransmitted by the collective group of nodes, based on a result of the processing.

37. A non-transitory computer-readable media storing computer instructions which when executed by one or more processors of a device cause the device to:

identify a collective group of nodes configured to at least one of transmit or receive messages as part of a messaging system;

collect a plurality of transmit checksums for the collective group of nodes, wherein each transmit checksum of the plurality of transmit checksums corresponds to a different node in the collective group of nodes and is a checksum of messages transmitted by the different node during a defined epoch;

collect a plurality of receive checksums for the collective group of nodes, wherein each receive checksum of the plurality of receive checksums corresponds to the different node in the collective group of nodes and is a checksum of messages received by the different node during the defined epoch; and collectively process the plurality of transmit checksums and the plurality of receive checksums to validate that all messages transmitted by the collective group of nodes during the defined epoch were correctly received by the collective group of nodes.

38. The non-transitory computer-readable media of claim 37, wherein the device is one node in the collective group of nodes.

39. The non-transitory computer-readable media of claim 37, wherein the device is one or more switches in communication with the collective group of nodes.

40. The non-transitory computer-readable media of claim 37, wherein the messages transmitted by the different node during the defined epoch each include at least one identifier indicating the defined epoch during which the message was transmitted and the collective group of nodes.

41. The non-transitory computer-readable media of claim 37, wherein the messages transmitted by the different node during the defined epoch each exclude a source identifier of a sender of the message.

42. The non-transitory computer-readable media of claim 37, wherein the messages transmitted by the different node during the defined epoch each exclude a checksum of a payload of the message.

43. The non-transitory computer-readable media of claim 37, wherein the processing is performed after a time to live configured for the defined epoch has expired.

44. The non-transitory computer-readable media of claim 37, wherein collectively processing the plurality of transmit checksums and the plurality of receive checksums includes:

reducing the plurality of transmit checksums to form a reduced transmit checksum for the defined epoch, reducing the plurality of receive checksums to form a reduced receive checksum for the defined epoch, comparing the reduced transmit checksum and the reduced receive checksum to form a comparison result, validating that all messages transmitted by the collective group of nodes during the defined epoch were correctly received by the collective group of nodes, based on the comparison result;

wherein when the comparison result indicates that the reduced transmit checksum and the reduced receive checksum match, then all messages transmitted by the collective group of nodes during the defined epoch are validated as having been correctly received by the collective group of nodes;

wherein when the comparison result indicates that the reduced transmit checksum and the reduced receive checksum do not match, then all messages transmitted by the collective group of nodes during the defined epoch are not validated as having been correctly received by the collective group of nodes.

45. The non-transitory computer-readable media of claim 37, wherein the one or more processors further cause the device to:

cause all messages transmitted by the collective group of nodes during the defined epoch to be retransmitted by the collective group of nodes, based on a result of the processing.

* * * * *